United States Patent
Andersen et al.

(10) Patent No.: US 11,591,479 B2
(45) Date of Patent: Feb. 28, 2023

(54) PRIMER COATING AGENT SYSTEM FOR PLASTIC SUBSTRATES

(71) Applicant: BASF Coatings GmbH, Münster (DE)

(72) Inventors: Audree Andersen, Muenster (DE); Miao Wang, Muenster (DE); Kai-Michael Wuennemann, Muenster (DE); Julia Melzer, Muenster (DE); Jens Lueckert, Muenster (DE); Frederik Foelling, Muenster (DE); Peter Machaczek, Muenster (DE); Igor Millbaier, Muenster (DE); Marc Baeuerle, Muenster (DE); Andreas Janssen, Muenster (DE); Tanja Bricke, Muenster (DE); Tobias Wolf, Muenster (DE); Thomas Focke, Muenster (DE)

(73) Assignee: BASF COATING GMBH, Münster (DE)

( * ) Notice: Subject to any disclaimer, the term of this patent is extended or adjusted under 35 U.S.C. 154(b) by 379 days.

(21) Appl. No.: 16/755,364

(22) PCT Filed: Oct. 23, 2018

(86) PCT No.: PCT/EP2018/078959
§ 371 (c)(1),
(2) Date: Apr. 10, 2020

(87) PCT Pub. No.: WO2019/081461
PCT Pub. Date: May 2, 2019

(65) Prior Publication Data
US 2020/0299519 A1 Sep. 24, 2020

(30) Foreign Application Priority Data

Oct. 23, 2017 (EP) .................... 17197843

(51) Int. Cl.
| | | |
|---|---|---|
| *B05D 7/00* | (2006.01) | |
| *C09D 5/00* | (2006.01) | |
| *C08K 3/013* | (2018.01) | |
| *C08G 18/10* | (2006.01) | |
| *C08G 18/38* | (2006.01) | |
| *C08G 18/48* | (2006.01) | |
| *C08G 18/60* | (2006.01) | |
| *C08G 18/62* | (2006.01) | |
| *C08G 18/73* | (2006.01) | |
| *C08G 18/75* | (2006.01) | |
| *C08G 18/79* | (2006.01) | |
| *C08K 5/5435* | (2006.01) | |

(52) U.S. Cl.
CPC ............ *C09D 5/002* (2013.01); *B05D 7/572* (2013.01); *C08G 18/10* (2013.01); *C08G 18/3893* (2013.01); *C08G 18/48* (2013.01); *C08G 18/603* (2013.01); *C08G 18/6225* (2013.01); *C08G 18/73* (2013.01); *C08G 18/755* (2013.01); *C08G 18/792* (2013.01); *C08K 3/013* (2018.01); *C08K 5/5435* (2013.01); *B05D 2201/02* (2013.01); *B05D 2420/01* (2013.01)

(58) Field of Classification Search
CPC .... B05D 7/574; B05D 7/572; B05D 2420/01; B05D 2520/00; B05D 2503/00; C09D 175/00
See application file for complete search history.

(56) References Cited

U.S. PATENT DOCUMENTS

| | | | |
|---|---|---|---|
| 4,720,528 A | 1/1988 | Etzell et al. | |
| 5,747,114 A | 5/1998 | Stegen et al. | |
| 5,854,338 A * | 12/1998 | Hovestadt ............ | C08G 18/809 524/591 |
| 9,751,900 B2 | 9/2017 | Kramer et al. | |
| 2003/0138642 A1 | 7/2003 | Kohler et al. | |
| 2006/0257671 A1 | 11/2006 | Yahkind | |
| 2007/0190311 A1 | 8/2007 | Hazan et al. | |
| 2010/0152336 A1 | 6/2010 | Bhattacharya et al. | |
| 2011/0070450 A1 | 3/2011 | Hazan et al. | |

FOREIGN PATENT DOCUMENTS

| | | |
|---|---|---|
| EP | 0872499 A1 | 10/1998 |
| EP | 1050551 A2 | 11/2000 |
| EP | 1958982 A2 | 8/2008 |
| EP | 2087944 A1 | 8/2009 |
| EP | 2999737 B1 | 3/2017 |
| JP | 2006117797 A | 5/2006 |
| JP | 2008031453 A | 2/2008 |
| JP | 2012000570 A | 1/2012 |
| JP | 2018178082 A | 11/2018 |
| WO | 2015114989 A1 | 8/2015 |

OTHER PUBLICATIONS

English translation of International Search Report for International Application No. PCT/EP2018/078959, dated Feb. 21, 2019, 2 pages.

* cited by examiner

*Primary Examiner* — Kuo Liang Peng
(74) *Attorney, Agent, or Firm* — Armstrong Teasdale LLP

(57) ABSTRACT

The present disclosure relates to a primer coating material composition, obtainable by combining at least two components (A) and (B) of a coating material system, which are different from one another and present separately from one another, with component (B) being nonaqueous and including at least one polyisocyanate having more than two free isocyanate groups, at least one organic solvent, and, further, at least one Si-containing compound which contains at least one hydrolyzable radical and at least one non-hydrolyzable organic radical, for at least partial application to at least one optionally pretreated surface of a plastics substrate, to a method for producing a corresponding coating on such a substrate, and to a method for at least partially coating at least one surface of a plastics substrate with a multicoat paint system.

16 Claims, No Drawings

PRIMER COATING AGENT SYSTEM FOR PLASTIC SUBSTRATES

CROSS-REFERENCE TO RELATED APPLICATIONS

This application is a U.S. National Phase Application of PCT/EP2018/078959, filed Oct. 23, 2018, which claims the benefit of priority to EP Application No. 17197843.0, filed Oct. 23, 2017, the contents of which are hereby expressly incorporated by reference in their entirety.

The present invention relates to the use of a primer coating material composition, obtainable by combining at least two components (A) and (B) of a coating material system, which are different from one another and present separately from one another, with component (B) being nonaqueous and comprising at least one polyisocyanate having more than two free isocyanate groups, at least one organic solvent, and, further, at least one Si-containing compound which contains at least one hydrolyzable radical and at least one non-hydrolyzable organic radical, for at least partial application to at least one optionally pretreated surface of a plastics substrate, to a method for producing a corresponding coating on such a substrate, and to a method for at least partially coating at least one surface of a plastics substrate with a multicoat paint system.

PRIOR ART

Within the realm of vehicle finishing, plastics have become established as materials for vehicle parts, and components for installation in and on vehicles, and vehicle accessory parts, both in the interior and on the exterior. Plastics, like other materials, are coated and painted for decorative reasons (for example, providing color and/or effect) and/or for technical usefulness (light stability and/or weather resistance, for example), with corresponding, suitable coating material compositions.

To protect the plastics it is usual first to apply a priming coat to prepared (pretreated) surfaces of the plastics. This priming coat, obtained by application to the plastic of a corresponding primer coating material (primer), then typically constitutes the first coat of a multicoat paint system which is applied to the plastics substrate in order to achieve the abovementioned decorative reasons and/or the technical usefulness.

Coating material compositions which can be used as primers, particularly as water-based primers, are disclosed for example in U.S. Pat. No. 4,720,528 and in JP 2008-031453 A1. U.S. Pat. No. 4,720,528 describes coating material compositions which comprise caprolactone-modified acrylic polymers, acrylic microgels, and melamine resins. The possible uses of these compositions include the coating of plastics substrates. JP 2008-031453 A1 discloses coating materials which can be used as primers and which necessarily comprise polyolefin resins modified with acid groups.

Primers are typically applied to and cured on the plastics substrate in a separate coating process prior to the actual coating with the remaining part of the multicoat paint system. This multicoat paint system typically includes—besides the primer—at least one color and/or effect basecoat and above it a clearcoat. Basecoat and clearcoat materials are either applied and cured separately or are each applied in a wet-on-wet process, with the two films subsequently undergoing joint curing (2C1B process). The implementation of a separate, upstream process step for the application of the primer is a disadvantage for economic reasons, namely owing to the greater time and cost involved. In particular, the separate step of curing the primer, and the associated inclusion of a separate, upstream oven in order to achieve this curing, are undesirable for these reasons, particularly in the context of the OEM production-line finishing of plastics substrates which require coating, as in the automotive OEM finishing segment.

In order to remove the disadvantages associated with a separate step of primer application, the prior art has already disclosed processes which envisage the incorporation of primer application into the wet-on-wet process. With these processes, primer and basecoat and clearcoat materials as well are applied by means of the wet-on-wet process, and all three films are subsequently jointly cured (3C1B process). 3C1B processes of this kind for the coating of substrates such as those made of plastic are known from, for example, US 2010/0152336 A1, WO 2015/114989 A1, and US 2006/0257671 A1. A corresponding 4C1B process, using two different basecoat materials, is known, moreover, from JP 2012-000570 A.

Furthermore, 3C1B processes of this kind for coating substrates made of plastics are known from US 2007/0190311 A1, US 2011/0070450 A1, U.S. Pat. No. 5,747,114, EP 1 958 982 A2 and EP 2 087 944 A1.

US 2007/0190311 A1 and US 2011/0070450 A1 describe 1K [1-component] primer coating materials based on organic solvents. For environmental reasons at least, however, the use of such primers is undesirable and disadvantageous. US 2006/0257671 A1 discloses 1K primer coating materials which comprise silane-functional, nonpolar polymers such as corresponding silane-functional polyolefins. U.S. Pat. No. 5,747,114 discloses physically drying primer coating materials based on polyurethanes and/or oligomeric urethanes, but their chemical construction is such that they cannot be made to crosslink chemically at temperatures of 60 to 110° C. Relative to 2K primers, moreover, a frequent disadvantage of 1K primers is the lack in all cases of sufficient crosslinking, and primers, or multicoat paint systems constructed on the basis of primers, do not always have the desired performance technology properties, with regard to their required weathering qualities, for example. Furthermore, particularly in OEM finishing on the line, 2K primers can be metered more effectively than 1K systems.

EP 1 958 982 A2 discloses a 3C1B process which provides for the successive application of a water-based primer coating material, a water-based basecoat material containing metallic effect pigments, and a clearcoat material with high solids content, and the joint curing of all three films at 70 to 100° C.; the solids content of a two-coat film formed from primer coating material and basecoat is also comparatively high and is 75%. The core of the process disclosed in EP 1 958 982 A2 can be seen in the use of the specific clearcoat material and, in particular, of the organic solvent used for preparing it, which allows the polyisocyanate likewise present in the clearcoat material to undergo partial migration into the basecoat and to contribute to the curing thereof. The primers described in the examples of EP 1 958 982 A2 are in each case 1K primers, with which the disadvantages already described above are often associated. Moreover, when using the comparatively high solids contents described in EP 1 958 982 A2, problems may occur with regard to sprayability and leveling.

EP 2 087 944 A1, lastly, discloses a 3C1B process which envisages the successive application of a water-based primer coating material, a water-based basecoat material, and a clearcoat material at 40 to 110° C. This primer coating material necessarily includes a polyolefin resin and an acrylic resin in a defined weight ratio to one another. The primers described in the examples of EP 2 087 944 A1 are in each case 1K primers, with which the disadvantages already described above are often associated. Moreover, the use of polyolefin resins in water-based primer coating materials is often disadvantageous, since it impacts adversely on the sensitivity to water and moisture. The use of chlorinated polyolefins in particular is a disadvantage in this regard. Moreover, the use of such chlorinated polyolefins is undesirable for environmental reasons.

Furthermore, primer coating material compositions known from the prior art and used for the coating of plastics, and also corresponding multicoat paint systems comprising such a primer and also basecoat material(s) and clearcoat material, often do not have performance technological properties that are always satisfactory, such as appearance and chemical resistance, for example, particularly when they have been applied to corresponding plastics substrates by means of a 3C1B process.

There is therefore a requirement for primer coating material compositions and for their suitability in a multistage 1B process such as, in particular, a 3C1B process for producing a multicoat paint system on plastics substrates, without the aforesaid disadvantages.

Problem

A problem addressed by the present invention, therefore, is that of providing an aqueous primer coating material composition which can be used for application to at least one surface of a plastics substrate and which has advantages over the aqueous primer coating material compositions known from the prior art. A particular problem addressed by the present invention is that of providing an aqueous primer coating material composition of this kind which allows a more environmental and more economic coating method as part of a 3C1B process than conventional primer coating compositions used. At the same time, however, the requisite performance technology properties, such as appearance and chemical resistance in particular, of multicoat paint systems comprising such a primer coating, basecoat material(s) and clearcoat material ought to be optimally fulfilled and if not in fact improved then in any case not impaired relative to the prior art.

Solution

This problem is solved by the subject matter claimed in the claims and also by the preferred embodiments of said subject matter that are described in the description hereinafter.

A first subject of the present invention is therefore the use of a primer coating material composition, obtainable by combining at least two components (A) and (B) of a coating material system, which are different from one another and are present separately from one another, where component (A) is aqueous and comprises at least one polymer (a1) which contains functional groups that are reactive toward isocyanate groups, and comprises at least one pigment (a2) and/or at least one filler (a3), where component (B) is nonaqueous and comprises at least one polyisocyanate (b1) having more than two free isocyanate groups, and also comprises at least one organic solvent (b2), and where component (B) further comprises at least one Si-containing compound (b3) which contains at least one hydrolyzable radical and at least one non-hydrolyzable organic radical, for at least partial application to at least one optionally pretreated surface of a plastics substrate.

A further subject of the present invention is a method for at least partially coating at least one surface of a plastics substrate with a primer, wherein the method comprises at least a step (1), namely
(1) at least partial application of the inventively employed primer coating material composition to at least one optionally pretreated surface of a plastics substrate.

A further subject of the present invention is a method for at least partially coating at least one surface of a plastics substrate with a multicoat paint system, wherein the method comprises at least the following steps (1) to (7), namely
(1) at least partial application of the inventively employed primer coating material composition to at least one optionally pretreated surface of a plastics substrate,
(2) interim drying of the primer coating material composition applied according to step (1), preferably at room temperature, to give a primer film,
(3) application of at least one basecoat composition to the primer film obtained after step (2),
(4) interim drying of the at least one basecoat composition applied according to step (3), preferably at room temperature, to give at least one basecoat film,
(5) application of a clearcoat composition to the at least one basecoat film obtained after step (4), and
(6) interim drying of the clearcoat composition applied according to step (5), preferably at room temperature, to give a clearcoat film, and
(7) joint curing of the resultant primer film, basecoat film(s), and clearcoat film at a temperature <100° C.

A further subject of the present invention is the coating material system as such used in the context of the use according to the invention mentioned above. A further subject of the present invention is a primer coating material composition which is obtainable by combining at least the components (A) and (B) of said coating material system.

It has surprisingly been found that the coating material system of the invention is suitable for producing a primer coating material composition which is suitable in turn for at least partial application to at least one surface of a plastics substrate and can be applied in particular within the method of the invention as part of a multicoat paint system to an optionally pretreated plastics substrate. This is advantageous both on environmental grounds, since a primer coating material composition produced from the coating material system of the invention represents an aqueous composition, and on economic grounds, since the suitability of the primer coating material composition for use in a 3C1B process results in economic advantages, because times and costs (energy input) can be reduced: in particular if the method of the invention is employed as part of the OEM finishing of plastics parts or as part of the finishing of plastics parts within the OEM production-line finishing of automobile bodies and/or parts thereof, it is possible, owing to the joint curing step of all applied films, to use only a single oven to cure all of the films.

It has further been found, surprisingly, that the requisite performance technology properties both of the resultant primer coatings and of multicoat paint systems made up of primer coating, basecoat material(s), and clearcoat material are optimally fulfilled and with regard to these properties there are in particular no disadvantages to be observed, but instead there are indeed advantages to be observed, particularly in respect of the appearance, shade, stone-chip resistance, and chemical resistance. It was surprising that this is achieved in particular through the presence of the at least one Si-containing compound (b3).

DETAILED DESCRIPTION

The term "comprising" in the sense of the present invention, especially in connection with the coating material system of the invention and with the coating material composition of the invention obtainable therefrom, preferably has the meaning of "consisting of". For example, with regard to the inventively employed components (A) and (B) of the coating material system—in addition to the constituents necessarily included therein (polymer (a1), water, pigment (a2) and/or filler (a3) in the case of (A), and polyisocyanate (b1), organic solvent (b2), and Si-containing compound (b3) in the case of (B))—it is possible for one or more of the further constituents optionally present, identified below, to be included in these components. All of these constituents may each be present in their preferred embodiments as stated hereinafter. Similar comments apply in respect of the coating material compositions of the invention that are obtainable from the coating material system of the invention.

Substrate

Substrates employed in accordance with the invention are, suitably, all plastics substrates that are customarily employed and are known to the skilled person. "Plastics substrates" or "substrates made of plastic" (hereinafter also referred to as "substrates of the invention") for the purposes of the present invention are preferably substrates composed of or based on at least one plastic. More particularly such substrates are plastics substrates which have at least one surface made of plastic. Plastics in question include all customary plastics known to the skilled person, especially polystyrene (PS), polyvinyl chloride (PVC), polyurethane (PU) or (PU-RIM), glass fiber-reinforced unsaturated polyesters, polymethyl-methacrylate (PMMA), polyphenylene sulfide (PPS), polyoxymethylene (POM), polyphenylene ether (PPE), polyphenylene oxide (PPO), polyurea, polybutadiene terephthalate (PBT), polycarbonate (PC), polycarbonate (PC) modified with polybutadiene terephthalate (PC-PBT), acrylonitrile-butadiene-styrene copolymers (ABS), polyolefins such as polyethylenes (PE) and polypropylene (PP) and also polyolefins such as, for example, polypropylene (PP) that are modified with ethylene-propylene-diene copolymers (EPDM) and/or with ethylene-butylene-diene copolymers (EBDM). Also possible here are plastics substrates which comprise different plastics among those stated, in other words mixtures of these plastics. Particularly preferred plastics are polyolefins such as polypropylene (PP) and polypropylene (PP) optionally modified with ethylene-propylene-diene copolymers (EPDM). The main purpose of modifying polyolefins of EPDM is to elasticize the plastic, and one of the possible effects of such modification is to influence the paintability of the plastic. Advantageous fractions of EPDM are at least 2 wt %, as for example from 2 to 20 wt %, based on the total weight of the plastic.

The inventively employed substrate may be pretreated or untreated, but is preferably a pretreated substrate. Possible pretreatments to which the substrate may be subjected include flaming, plastic treatment and/or corona discharge, more particularly flaming. These pretreatments are known to the skilled person.

The inventively employed substrates may be plastics panels. Preferred substrates used are vehicle parts, and also parts for installation in or on vehicles, and vehicle accessory parts, made from plastics, for both the vehicle interior and the vehicle exterior.

Coating Material System of the Invention

The coating material system of the invention is suitable for producing a primer coating material composition.

The skilled person is aware of the term "primer" or "primer coating material composition". For the purposes of the present invention and in agreement with DIN EN ISO 4618 (German version, date: March 2007), the term refers to a priming material which is used for producing a priming coat on the substrate to be coated. The resulting priming coat then constitutes the first coat of a multicoat paint system on the substrate.

The coating material system of the invention comprises at least the components (A) and (B). Preferably the system may consist of the two components (A) and (B). In that case the coating material system of the invention is a two-component coating material system (2K coating material system). Alternatively, besides the two components (A) and (B), the coating material system of the invention may comprise a further component (C), which is different from (A) and (B) and is likewise present separately from (A) and (B). This component (C) acts as a component used for dilution, comprising one or more organic solvents and/or water.

Through combination of at least components (A) and (B) and optionally (C) of the coating material system of the invention, preferably shortly before planned application to the substrate, a primer coating material composition of the invention is obtainable.

The primer coating material composition of the invention which is preparable by combining at least the two components (A) and (B) and also optionally (C), in view of the use of the aqueous component (A), is likewise aqueous overall.

The components (A) and (B) within the coating material system of the invention are preferably present relative to one another such that the molar ratio of the functional groups of the polymer (a1) that are reactive toward isocyanate groups, which are preferably OH groups, to the isocyanate groups of the polyisocyanate (b1) is in a range from 1:1 to 1:20, more preferably in a range from 1:1.1 to 1:15, very preferably in a range from 1:1.2 to 1:12.5, especially preferably in a range from 1:1.5 to 1:10, most preferably in a range from 1:2 to 1:9.

The components (A) and (B) within the coating material system of the invention are preferably present relative to one another such that the NCO content of a coating material composition which is preparable by combination at least of the two components (A) and (B) and also, optionally, (C), based in each case on the total solids content of this composition, is in a range from 1 to 12 wt %, more preferably in a range from 1 to 10 wt %, very preferably in a range from 1.5 to 9 wt %, more preferably still in a range from 2 to 8 wt %, most preferably in a range from 3 to 7 wt %. This NCO content corresponds in each case to the theoretically calculated NCO content.

Component (A)

The fractions in wt % of all of the constituents present in the inventively employed component (A) add up to 100 wt %, based on the total weight of component (A).

Component (A) of the coating material system of the invention is aqueous. The term "aqueous" in connection with component (A) is to be understood for the purposes of the present invention as a system whose solvent comprises water as its main constituent, preferably in an amount of at least 25 wt %, and organic solvents in smaller fractions, preferably in an amount of <20 wt %, based in each case on the total weight of component (A).

The inventively employed component (A) preferably comprises a fraction of water of at least 27.5 wt %, more preferably of at least 30 wt %, very preferably of at least 32.5 wt %, more particularly of at least 35 wt %, based in each case on the total weight of component (A).

The inventively employed component (A) preferably comprises a fraction of water which is in a range from 25 to 70 wt %, more preferably in a range from 27.5 to 65 wt %, very preferably in a range from 30 to 60 wt %, more particularly from 32.5 wt % to 55 wt % or to 50 wt %, based in each case on the total weight of component (A).

The inventively employed component (A) preferably comprises a fraction of organic solvents which is in a range of <20 wt %, more preferably in a range from 0 to <20 wt %, very preferably in a range from 0.5 to 20 wt % or to 17.5 wt % or to 15 t %, based in each case on the total weight of component (A).

All customary organic solvents known to the skilled person may be used as organic solvent for preparing the inventively employed component (A), more particularly aprotic organic solvents and/or those which are chemically inert toward the components used for crosslinking such as (a1), (b1), and (b3). The concept of "organic solvent" is known to the skilled person, in particular from Council Directive 1999/13/EC of Mar. 11, 1999 (where it is referred to as solvent). The organic solvent or solvents are preferably selected from the group consisting of mono- or polyhydric alcohols, as for example methanol, ethanol, 1-propanol, 2-propanol, 1-butanol, ethylene glycol, ethyl glycol, propyl glycol, butyl glycol, butyl diglycol, 1,2-propanediol and/or 1,3-propanediol, ethers, as for example diethylene glycol dimethyl ether, aliphatic hydrocarbons, aromatic hydrocarbons, examples being toluene and/or xylenes, ketones, examples being acetone, N-methylpyrrolidone, N-ethylpyrrolidone, methyl isobutyl ketone, isophorone, cyclohexanone, methyl ethyl ketone, esters, examples being methoxypropyl acetate, ethyl acetate and/or butyl acetate, amides, as for example dimethylformamide, and mixtures thereof.

The solids content of the inventively employed component (A) is preferably in a range from 10 to 70 wt %, more preferably in a range from 15 to 65 wt %, very preferably in a range from 20 to 60 wt %, more particularly from 25 wt % to 55 wt %, based in each case on the total weight of component (A). The solids content is determined with the method described hereinafter.

The inventively employed component (A) comprises at least one polymer having functional groups that are reactive toward isocyanate groups (constituent (a1)).

The term "polymer" is known to the skilled person and for the purposes of the present invention encompasses not only polyadducts but also chain-growth addition polymers and polycondensates. Subsumed under the term "polymer" are not only homopolymers but also copolymers.

The at least one polymer (a1) contained in component (A) acts as a constituent of the binder system employed within the primer coating material composition of the invention. The term "binder" is used for the purposes of the present invention and in agreement with DIN EN ISO 4618 (German version, date: March 2007) to refer to the nonvolatile fractions of a coating material composition and/or of a coating material system, such as of the coating material system of the invention, that are responsible for film formation. Pigments included in such a composition or system, including the pigment and any fillers present, are therefore not included within the term "binder". The nonvolatile fraction (solids fraction, solids content) may be determined in accordance with the method described hereinafter. The term "binder" comprehends not only the polymer (a1) present in component (A) but also crosslinking agent present, as for example polyisocyanate (b1) present in component (B), and also any additives optionally present that fall within the definition of a binder.

The at least one polymer (a1) used within component (A) is preferably selected from the group consisting of polyurethanes, polyureas, polyesters, polyamides, polyethers, poly(meth)acrylates and/or copolymers of the stated polymers, especially polyurethane-poly(meth)acrylates and/or polyurethane-polyureas. With particular preference the at least one polymer used in component (A) is selected from the group consisting of polyurethanes, polyesters, poly(meth)acrylates and/or copolymers of the stated polymers. The expression "(meth)acryl . . . " or "(meth)acrylate" for the purposes of the present invention encompasses in each case the definitions "methacryl . . . " and/or "acryl . . . ", "methacrylate" and/or "acrylate".

Preferred polyurethanes are described for example in German patent application DE 199 48 004 A1, page 4, line 19 to page 11, line 29 (polyurethane prepolymer B1), in European patent application EP 0 228 003 A1, page 3, line 24 to page 5, line 40, in European patent application EP 0 634 431 A1, page 3, line 38 to page 8, line 9, and in international patent application WO 92/15405, page 2, line 35 to page 10, line 32.

Preferred polyesters are described for example in DE 4009858 A1 at column 6, line 53 to column 7, line 61 and column 10, line 24 to column 13, line 3, or in WO 2014/033135 A2 at page 2, line 24 to page 7, line 10 and also page 28, line 13 to page 29, line 13.

Preferred polyurethane-poly(meth)acrylate copolymers ((meth)acrylated polyurethanes) and their preparation are described for example in WO 91/15528 A1, page 3, line 21 to page 20, line 33, and in DE 4437535 A1, page 2, line 27 to page 6, line 22.

Preferred poly(meth)acrylates, moreover, are those which can be prepared by multistage radical emulsion polymerization of olefinically unsaturated monomers in water and/or organic solvents. Particularly preferred for example are seed-core-shell polymers (SCS polymers). Such polymers and aqueous dispersions comprising such polymers are known for example from WO 2016/116299 A1.

Preferred polyurethane-polyurea copolymers are polyurethane-polyurea particles comprising in each case in reacted form, at least one polyurethane prepolymer containing isocyanate groups, which contains anionic groups and/or groups which can be converted into anionic groups, and also at least one polyamine containing two primary amino groups and one or two secondary amino groups. Copolymers of this kind are used preferably in the form of an aqueous dispersion. Such polymers are preparable in principle by conventional polyaddition of, for example, polyisocyanates with polyols and also polyamines.

It is preferred not to use any polyolefins as polymer (a1). With preference none of components (A), (B), and optionally (C) of the coating material system contains any polyolefins. Preferably, accordingly, the coating composition of the invention as well contains no polyolefins.

The polymer (a1) used in component (A) has reactive functional groups which allow a crosslinking reaction with isocyanate groups. Any customary crosslinkable reactive functional group that can be used for this purpose and is known to the skilled person is contemplated. The polymer (a1) used in component (A) preferably has at least one kind of functional reactive groups selected from the group consisting of primary amino groups, secondary amino groups, hydroxyl groups, thiol groups, carboxyl groups, and carbamate groups. The polymer (a1) used in component (A) preferably has functional hydroxyl groups.

The polymer (a1) used in component (A) is preferably hydroxy-functional and with more particular preference possesses an OH number in the range from 15 to 250 mg KOH/g, more preferably from 20 to 200 mg KOH/g. The OH number can be calculated.

With particular preference the polymer (a1) used in component (A) is a hydroxy-functional polyurethane-poly(meth)acrylate copolymer, a hydroxy-functional polyester and/or a hydroxy-functional polyurethane-polyurea copolymer.

Component (A1) comprises at least one pigment (a2) and/or at least one filler (a3).

The term "pigment" is known to the skilled person, from DIN 55943 (date: October 2001), for example. A "pigment" in the sense of the present invention refers preferably to constituents in powder or flake form which are substantially, preferably entirely, insoluble in the application medium surrounding them, such as component (A) of the coating material system of the invention or of the coating material composition of the invention, for example. They are preferably colorants and/or substances which can be used as pigment on account of their magnetic, electrical and/or electromagnetic properties. Pigments differ from "fillers" preferably in their refractive index, which for pigments is 1.7.

The concept of pigments encompasses color pigments (the terms "color-imparting pigment" and "color pigment" are interchangeable) and effect pigments. Effect pigments are preferably those pigments which impart optical effect or both color and optical effect, more particularly optical effect. The terms "optical effect and color pigment", "optical effect pigment", and "effect pigment" are therefore interchangeable. Examples of preferred effect pigments are flakelike metallic effect pigments such as lamellar aluminum pigments, gold bronzes, oxidized bronzes and/or iron-oxide-aluminum pigments, pearlescent pigments such as pearl essence, basic lead carbonate, bismuth oxychloride and/or metal oxide-mica pigments and/or other effect pigments such as lamellar graphite, lamellar iron oxide, multilayer effect pigments composed of PVD films and/or liquid-crystal polymer pigments.

In principle the use of effect pigments as pigment (a2) in component (A) is possible. Since, however, the coating material composition obtainable using (A) is to be employed as a primer coating material composition, the incorporation of effect pigments into component (A) is not preferable. Preferably, therefore, component (A) contains no effect pigments. With preference the entire coating material system of the invention and also the coating material composition obtainable therefrom contain no effect pigments.

Employed with preference as pigment (a2), therefore, are color pigments. As color pigment it is possible to use organic and/or inorganic pigments. The color pigment is preferably an inorganic color pigment. Particularly preferred color pigments used are white pigments, chromatic pigments and/or black pigments. Examples of white pigments are titanium dioxide, zinc white, zinc sulfide, and lithopone. Examples of black pigments are carbon black, iron manganese black, and spinel black. Examples of chromatic pigments are chromium oxide, chromium oxide hydrate green, cobalt green, ultramarine green, cobalt blue, ultramarine blue, manganese blue, ultramarine violet, cobalt and manganese violet, red iron oxide, cadmium sulfoselenide, molybdate red and ultramarine red, brown iron oxide, mixed brown, spinel phases and corundum phases, and chromium orange, yellow iron oxide, nickel titanium yellow, chromium titanium yellow, cadmium sulfide, cadmium zinc sulfide, chromium yellow, and bismuth vanadate. Examples of suitable organic color-imparting pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

The fraction of the pigments (a2) is preferably in the range from 1.0 to 40.0 wt %, preferably 2.0 to 35.0 wt %, more preferably 5.0 to 30.0 wt %, based in each case on the total weight of component (A).

The fraction of the pigments (a2) is preferably in the range from 0.5 to 35.0 wt %, more preferably 1.0 to 30.0 wt %, very preferably 2.0 to 25 wt %, based in each case on the total weight of the coating material composition of the invention that is obtainable from the coating material system of the invention.

The term "filler" is likewise known to the skilled person, from DIN 55943 (date: October 2001), for example. A "filler" in the sense of the present invention is preferably a constituent which is substantially insoluble, preferably entirely insoluble, in the application medium, such as component (A) of the coating material system of the invention or of the coating material composition of the invention, for example, and which is used in particular for increasing the volume. "Fillers" in the sense of the present invention preferably differ from "pigments" in their refractive index, which for fillers is <1.7.

Any customary filler known to the skilled person may be used as constituent (a3). Examples of suitable fillers are kaolin, dolomite, calcite, chalk, calcium sulfate, barium sulfate, graphite, silicates such as magnesium silicates, especially corresponding phyllosilicates such as hectorite, bentonite, montmorillonite, talc and/or mica, silicas, more particularly fumed silicas, hydroxides such as aluminum hydroxide or magnesium hydroxide, or organic fillers such as textile fibers, cellulose fibers, polyethylene fibers or polymer powders; for further details, refer to Rompp Lexikon Lacke and Druckfarben, Georg Thieme Verlag, 1998, pages 250 ff., "Fillers".

The fraction of the fillers (a3) is preferably in the range from 1.0 to 40.0 wt %, more preferably 2.0 to 35.0 wt %, very preferably 5.0 to 30.0 wt %, based in each case on the total weight of component (A).

The fraction of the fillers (a3) is preferably in the range from 0.5 to 35.0 wt %, more preferably 1.0 to 30.0 wt %, very preferably 2.0 to 25 wt %, based in each case on the total weight of the coating material composition of the invention that is obtainable from the coating material system of the invention.

Component (A) may optionally further comprise at least one thickener (also referred to as thickening agent). Examples of such thickeners are inorganic thickeners, examples being metal silicates such as phyllosilicates, and organic thickeners, examples being poly(meth)acrylic acid thickeners and/or (meth)acrylic acid-(meth)acrylate copolymer thickeners, polyurethane thickeners, and also polymeric waxes. The metal silicate is preferably selected from the group of the smectites. The smectites are more preferably selected from the group of the montmorillonites and hectorites. The montmorillonites and hectorites are more particularly selected from the group consisting of aluminum-magnesium silicates and also sodium magnesium phyllosilicates and sodium magnesium fluorine lithium phyllosilicates. These inorganic phyllosilicates are sold for example under the brand name Laponite®. Thickening agents based on poly(meth)acrylic acid and (meth)acrylic acid-(meth)acrylate copolymer thickeners are optionally crosslinked and/or neutralized with a suitable base. Examples of such thickeners are "Alkali Swellable Emulsions" (ASE), and hydrophobically modified variants thereof, the "Hydrophically modified Alkali Swellable Emulsions" (HASE). These thickening agents are preferably anionic. Corresponding products such as Rheovis® AS 1130 are available commercially. Thickening agents based on polyurethanes (e.g. polyurethane associative thickeners) are optionally crosslinked and/or neutralized with a suitable base. Corresponding products such as Rheovis® PU 1250 are available commercially. Examples of suitable polymeric waxes include modified or unmodified polymeric waxes based on ethylene-vinyl acetate copolymers. One such product is available commercially under the Aquatix® 8421 designation, for example.

The at least one thickener is present preferably in component (A) in an amount of at most 10 wt %, more preferably at most 7.5 wt %, very preferably at most 5 wt %, more particularly at most 3 wt %, most preferably at most 2 wt %, based in each case on the total weight of component (A). The minimum amount of thickener here is preferably 0.1 wt % in each case, based on the total weight of component (A).

Component (A) may comprise one or more commonly employed additives as further optional constituents. For example, component (A) may include, as already observed above, a certain fraction of at least one organic solvent. Component (A) may further comprise at least one additive selected from the group consisting of reactive diluents, light stabilizers, antioxidants, deaerating agents, emulsifiers, slip additives, polymerization inhibitors, radical polymerization initiators, adhesion promoters, flow control agents, film-forming assistants, sag control agents (SCAs), flame retardants, corrosion inhibitors, siccatives, biocides, and matting agents. They may be used in the known and customary proportions. The amount thereof, based on the total weight of component (A), is preferably 0.01 to 20.0 wt %, more preferably 0.05 to 15.0 wt %, very preferably 0.1 to 10.0 wt %, especially preferably 0.1 to 7.5 wt %, more particularly 0.1 to 5.0 wt %, and most preferably 0.1 to 2.5 wt %.

Component (B)

The fractions in wt % of all constituents included in component (B) used in accordance with the invention add up to 100 wt %, based on the total weight of component (B).

Component (B) of the coating material system of the invention is nonaqueous. The term "nonaqueous" in connection with component (B) refers for the purposes of the present invention to a system which is at least substantially water-free. The presence of water within component (B) is undesirable since otherwise there might be reaction of the water with an NCO group of the polyisocyanate (b1). Moreover, there may be a reaction of water with the Si-containing compound (b3), such as a silane, with elimination of an alcohol, which may in turn react with an NCO group of the polyisocyanate (b1). Furthermore, in the silanol group which is likewise formed in this case may react with a further such group and/or with a hydrolyzable group of the Si-containing compound (b3), reactions which are likewise undesirable at this point in time. The presence of traces of water—as a result, for example, of the presence of water in constituents used for preparing component (B)—can nevertheless not be ruled out entirely. Therefore component (B) is at least substantially water-free. This preferably means that component (B) contains water, if at all, in an amount of at most 0.5 wt %, more preferably at most 0.25 wt %, very preferably at most 0.1 wt %, more particularly <0.1 wt %, most preferably <0.05 wt %, based in each case on the total weight of component (B).

Component (B) comprises at least one organic solvent (b2), preferably in an amount of up to 40 wt %, based on the total weight of component (B). Organic solvents (b2) contemplated are the same solvents as already stated above in connection with component (A). In order to prevent (premature) crosslinking with the isocyanate groups of the polyisocyanate (b1), however, (b2) is preferably chemically inert toward a reaction with the isocyanate groups of (b1). In particular, therefore, (b2) is not an alcohol.

The inventively employed component (B) preferably comprises a fraction of (b2) of up to 37.5 wt %, more preferably of up to 35 wt %, very preferably of up to 32.5 wt %, more particularly of up to 30 wt %, based in each case on the total weight of component (B).

The inventively employed component (B) preferably comprises a fraction of (b2) which is in a range from 1 to 40 wt %, more preferably in a range from 2 to 37.5 wt %, very preferably in a range from 3 to 35 wt %, more particularly of 4 wt % to 32.5 wt % or of 5 wt % to 30 wt %, based in each case on the total weight of component (B).

The solids content of the inventively employed component (B) is preferably in a range from 50 to 99 wt %, more preferably in a range from 55 to 95 wt %, very preferably in a range from 60 to 90 wt %, more particularly from 65 wt % to 85 wt %, based in each case on the total weight of component (B). The solids content is determined with the method described hereinafter.

Component (B) of the coating material system of the invention comprises at least one polyisocyanate (b1) having more than two free isocyanate groups.

Polyisocyanates (b1) used are preferably (hetero) aliphatic, (hetero) cycloaliphatic, (hetero) aromatic and/or (hetero) aliphatic-(hetero)aromatic polyisocyanates.

The at least one polyisocyanate (b1) preferably has on average 2.4 to 4, more preferably 2.6 to 4, and very preferably 2.8 to 3.6 NCO groups, and preferably comprises at least one isocyanurate ring and/or iminooxadiazinedione ring. The isocyanurate ring and the iminooxadiazinedione ring are each preferably formed by trimerization of diisocyanates in this case, which are preferably selected from the group consisting of hexamethylene diisocyanate and isophorone diisocyanate and also mixtures thereof.

Particular preference is given to using isocyanurate trimers of hexamethylene diisocyanate and/or of isophorone diisocyanate, and/or oligomers and/or polymers of isophorone diisocyanate and/or hexamethylene diisocyanate, as polyisocyanate (b1) within component (B). The skilled person is aware of corresponding products available commercially. Examples are products of the Desmodur® series from Bayer, such as Desmodur® XP 2565 and/or Desmodur® N 3600, for example. Employed with particular preference are isocyanurate trimers of hexamethylene diisocyanate as polyisocyanate (b1) within component (B).

The inventively employed component (B) preferably comprises a fraction of (b1) which is in a range from 50 to 95 wt %, more preferably in a range from 55 to 92.5 wt %, very preferably in a range from 60 to 90 wt %, more particularly from 62.5 wt % to 87.5 wt % or from 60 wt % to 85 wt %, based in each case on the total weight of component (B) and on the solids content of (b1).

Component (B) of the coating material system of the invention comprises at least one Si-containing compound (b3) which contains at least one hydrolyzable, preferably organic, radical and at least one non-hydrolyzable organic radical, the latter optionally having at least one functional group that is reactive toward isocyanate groups and is in turn optionally masked with at least one protective group which can be eliminated under hydrolytic conditions.

The skilled person is aware of the term "hydrolyzable radical". Any customary hydrolyzable radical known to the skilled person may serve as a constituent of the Si-containing compound (b3). "Hydrolyzable radicals" for the purposes of the present invention are preferably organic and/or inorganic radicals, more preferably organic radicals. A "hydrolyzable radical" in the sense of the present invention is preferably a hydrolyzable radical selected from the group consisting of halides, preferably fluorides, chlorides, bromides, and iodides, more particularly fluorides and chlorides, alkoxy groups, preferably alkoxy groups 0-Fe, in which $R^a$ is a $C_{1-16}$ aliphatic radical, preferably $C_{1-10}$ aliphatic radical, more preferably $C_{1-6}$ aliphatic radical, more particularly $C_{1-6}$ alkyl radical, such as methyl, ethyl, n-propyl, isopropyl, n-butyl, isobutyl or tert-butyl, which is optionally substituted by a $C_{1-6}$ alkoxy group; carboxylate groups, preferably $C_{1-6}$ carboxylate groups, more particularly carboxylate groups selected from the group consisting of acetate; and diketonate groups, preferably selected from the group consisting of acetylacetonate, acetonylacetonate, and diacetylate. With particular preference a "hydrolyzable radical" means an alkoxy group, preferably an alkoxy group O—Ra, in which Ra is a $C_{1-16}$ aliphatic radical, preferably $C_{1-10}$ aliphatic radical, more preferably $C_{1-6}$ aliphatic radical, more particularly $C_{1-6}$ alkyl radical, such as methyl, ethyl, n-propyl, isopropyl, n-butyl, isobutyl or tert-butyl, which is optionally substituted by a $C_{1-6}$ alkoxy group.

The Si-containing compound (b3) has at least one hydrolyzable, preferably organic, radical, i.e. it has one or more—for example, two or three—such radicals.

The Si-containing compound (b3) also has at least one, i.e. one or more than one—for example, two or three-non-hydrolyzable organic radical. This radical in turn may optionally have at least one functional group that is reactive toward isocyanate groups and that is optionally in turn masked with at least one protective group which can be eliminated under hydrolytic conditions.

Functional groups that are reactive toward isocyanate groups in the non-hydrolyzable organic radical of the at least one Si-containing compound (b3), and which are optionally masked with at least one protective group which can be eliminated under hydrolytic conditions, are preferably selected from the group consisting of hydroxyl groups, thiol groups, primary and secondary amino groups, and mixtures thereof.

The at least one functional group that is reactive toward isocyanate groups in the non-hydrolyzable organic radical of the at least one Si-containing compound (b3) may—if (b3) is present in component (B)—be masked with a protective group which can be eliminated under hydrolytic conditions, in order to prevent immediate reaction with the isocyanate groups of the polyisocyanate (b1) which is likewise present in component (B).

The non-hydrolyzable organic radical of the at least one Si-containing compound (b3) is preferably selected from the group consisting of aliphatic radicals having 1 to 24 carbon atoms, cycloaliphatic radicals having 3 to 12 carbon atoms, aromatic radicals having 6 to 12 carbon atoms, and araliphatic radicals having 7 to 18 carbon atoms, each of these radicals optionally containing at least one functional group that is reactive toward isocyanate groups, said group in turn being optionally masked with at least one protective group which can be eliminated under hydrolytic conditions. Moreover, each of the aforesaid aliphatic, cycloaliphatic, aromatic, and araliphatic radicals may contain one or more heteroatoms such as N, O and/or S, and/or heteroatom groups. By way of example, each of these radicals, such as in particular a corresponding aliphatic radical, may contain at least one epoxide group.

Examples of Si-containing compounds (b3) which have at least one non-hydrolyzable organic radical selected from the group consisting of aliphatic radicals having 1 to 24 carbon atoms are Si-containing compound (b3) which have at least one aliphatic radical having 1 to carbon atoms, are methyltrimethoxysilane (MTMS), methyltriethoxysilane (MTES), methyltripropoxysilane, methyltriisopropoxysilane, ethyltrimethoxysilane, ethyltriethoxysilane, ethyltripropoxysilane, ethyltriisopropoxysilane, octyltrimethoxysilane, isobutyltriethoxysilane, isobutyltrimethoxysilane, octyltriethoxysilane, hexyltrimethoxysilane, hexyltriethoxysilane, decyltrimethoxysilane, and decyltriethoxysilane, hexadecyltrimethoxysilane, hexadecyltriethoxysilane, and also 1,2-bis(triethoxysilyl)ethane and 1,2-bis(trimethoxysilyl)ethane.

Examples of Si-containing compounds (b3) which have at least one non-hydrolyzable organic radical selected from the group consisting of aromatic radicals having 6 to 12 carbon atoms are phenyltrimethoxysilane (PHS), phenyltriethoxysilane, phenyltripropoxysilane, and phenyltriisopropoxysilane.

Examples of Si-containing compounds (b3) which have at least one non-hydrolyzable organic radical selected from the group consisting of araliphatic radicals having 7 to 18 carbon atoms are benzyltrimethoxysilane, benzyltriethoxysilane, benzyltripropoxysilane, and benzyltriisopropoxysilane.

The Si-containing compound (b3) may comprise at least one Si-containing radical such as exactly one such radical (as in the case of monosilanes) or else two or more such radicals (as in the case of bis- or tris-silanes) as in the case of 1,2-bis(triethoxysilyl)ethane. Also possible is the use of Si-containing compounds (b3), which have four, five, six or more silyl groups. Examples of Si-containing compounds (b3) of these kinds are, for example, reaction products of bis-silanes whose silyl groups are bridged via an alkyl radical which carries a secondary amino group (such as the commercial product Dynasylan® 1124) with polyisocyanates of the kind which can be used, for example, as polyisocyanate (b1), such as, for example, isocyanurate trimers (especially HDI trimers). Such reaction products have a total of six silyl groups.

Hydrolyzable silane compounds which contain at least one primary and/or secondary amino group are, for example, 3-aminopropyltrimethoxysilane (APS), 3-aminopropyltriethoxysilane, 3-aminopropyltriisopropoxysilane, 2-aminoethyltrimethoxysilane, 2-aminoethyltriethoxysilane, 2-aminoethyltriisopropoxysilane, aminomethyltrimethoxy-silane, aminomethyltriethoxysilane, aminomethyltriiso-propoxysilane, 3-(2-aminoethyl)aminopropyltrimethoxy-silane (AEAPS), 3-(2-aminoethyl)aminopropyltriethoxy-silane, 3-(2-aminoethyl)aminopropyltriisopropoxysilane, 2-(2-aminoethyl)aminoethyltrimethoxysilane, 2-(2-aminoethyl)aminoethyltriethoxysilane 2-(2-aminoethyl)-aminoethyltriisopropoxysilane, 3-(3-aminopropyl)aminopropyltrimethoxysilane, 3-(3-aminopropyl)aminopropyltriethoxysilane, 3-(3-aminopropyl)aminopropyltriisopropoxysilane, diethylenetriaminopropyltrimethoxy-silane, diethylenetriaminopropyltriethoxysilane, N-(n-butyl)-3-aminopropyltrimethoxysilane, N-(n-butyl)-3-aminopropyltriethoxysilane, N-cyclohexylaminomethyl-triethoxysilane, N-cyclohexylaminomethyltrimethoxy-silane, N-ethyl-γ-aminoisobutyltrimethoxysilane, N-ethyl-γ-aminoisobutyltriethoxysilane, N-(vinylbenzyl)-2-aminoethyl-3-aminopropyltrimethoxy-silane hydrochloride, N-phenyl-γ-aminopropyltri-methoxysilane, N-phenyl-γ-aminopropyltriethoxysilane, γ-ureidopropyltrimethoxysilane, γ-ureidopropyl-triethoxysilane, N-methyl-[3-(trimethoxysilyl)propyl]carbamate, and/or N-trimethoxysilylmethyl-O-methylcarbamate, and also bis[γ-(triethoxysilyl)propyl]amine, bis[γ-(trimethoxysilyl) propyl]amine. Bis[γ-(triethoxysilyl)propyl]amine, and bis[γ-(trimethoxysilyl)propyl]amine. Each of these silane compounds may be used as Si-containing compound (b3). Moreover, the amino group of each of these compounds may be masked with a protective group which can be eliminated under hydrolytic conditions. Corresponding protective groups with which the amino function can be protected are known to the skilled person: examples suitable for the purpose include dimethylbutylidene groups, which can be eliminated with hydrolysis in accordance with the following scheme:

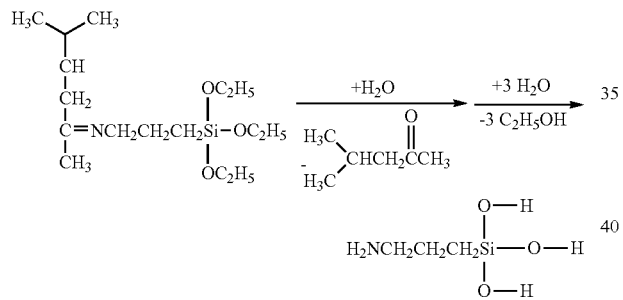

Hydrolyzable silane compounds which contain at least one thiol group are, for example, 3-mercaptopropyltrimethoxysilane (MPTMS), 3-mercapto-propyltriethoxysilane, 3-mercaptopropyltriisopropoxy-silane, 2-mercaptoethyltrimethoxysilane, 2-mercapto-ethyltriethoxysilane and/or 2-mercaptoethyltriiso-propoxysilane. Each of these silane compounds may be used as Si-containing compound (b3). Moreover, the thiol group of each of these compounds may be masked with a protective group which can be eliminated under hydrolytic conditions. Corresponding protective groups with which the thiol function can be protected are known to the skilled person: for example, suitable silanes containing thioether groups can be converted under these conditions into corresponding thiol-group-containing silanes:

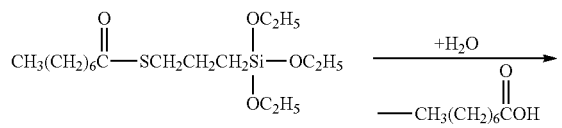

Hydrolyzable silane compounds which contain at least one epoxide group, as an example of an hydroxyl group masked with a protective group which can be eliminated under hydrolytic conditions, are, for example, 3-glycidyloxypropyltrimethoxysilane (GLYMO), 3-glycidyloxypropyltriethoxysilane, 3-glycidyloxypropyltriisopropoxyoxysilane, 2-glycidyloxyethyltrimethoxysilane, 2-glycidyloxyethyltriethoxysilane, 2-glycidyloxyethyltriisopropoxyoxysilane, β-(3,4-epoxycyclohexyl)ethyltrimethoxysilane, and/or β-(3,4-epoxycyclohexyl)ethyltriethoxysilane. Corresponding products are available commercially, for example, under the names Silquest® A-186 and A-187.

Si-containing compounds (b3) whose at least one non-hydrolyzable organic radical carries at least one epoxide group are particularly preferred.

Preference as silane compound (b3) is given to using at least one alkoxysilane of the structural formula (I)

A-R—Si(R')x(OR")3-x (I), where
A is a functional group that is reactive toward isocyanate groups and is optionally masked with a protective group which can be eliminated under hydrolytic conditions, or is H,
R is an aliphatic radical having 1 to 24 or having 1 to 12 carbon atoms, a cycloaliphatic radical having 3 to 12 carbon atoms, an aromatic radical having 6 to 12 carbon atoms or an aralphatic radical having 7 to 18 carbon atoms,
the R' radical is selected from the group of C$_1$- to C=alkyl radicals,
R" is a methyl or ethyl radical, and
x=0 to 2.

An aliphatic radical R here means an organic radical which possesses no aromatic groups such as a phenyl radical for example. The aliphatic radical R may have 1 to 24 or 1 to 12 carbon atoms. Preferably the aliphatic radical R has 2 to 12, more preferably 3 to 10, carbon atoms. A cycloaliphatic radical R means an organic radical which possesses no aromatic groups such as a phenyl radical, for example. The cycloaliphatic radical R may have 3 to 12 carbon atoms, as in the case of cyclopropyl or cyclohexyl, for example. Aliphatic and cycloaliphatic radicals as well may be saturated or unsaturated. An example of such an unsaturated aliphatic radical is an ethenyl group as in the case of vinyltrimethoxysilane and/or vinyltriethoxysilane, for example, as an example of (b3). An aromatic radical R means an organic radical which is composed of aromatic groups, such as a phenylene radical, for example. The aromatic radical R may have 6 to 12 carbon atoms. An aralphatic radical R means an organic radical which has not only aromatic groups but also aliphatic groups. The aralphatic radical R may have 7 to 18 carbon atoms. A radical R such as an aliphatic radical R may in addition to carbon and hydrogen also contain heteroatoms, such as oxygen, nitrogen or sulfur. In addition, there may in each case likewise be further functional groups present, such as ester groups or urethane groups. More preferably, R is an aliphatic radical having 1 to 12 carbon atoms or having 1 to 10 carbon atoms, very preferably 1 to 8 carbon atoms, and especially 1 to 6 carbon atoms. To the skilled person it is clear that the radical R is a divalent radical.

The radical R' is preferably a $C_1$ to $C_{10}$ alkyl radical, more preferably a $C_1$ to $C_8$ alkyl radical, and very preferably a $C_1$ to $C_6$ alkyl radical.

With particular preference alkoxysilanes of the general structural formula (I.1) and/or (I.2), very preferably (I.1), are used, namely

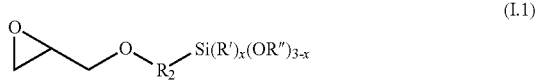

(I.1)

(I.2)

where $R_2$ is a $C_1$ to $C_{10}$ alkylene radical, a $C_2$ to $C_{10}$ alkenylene radical or a multiply unsaturated $C_4$ to $C_{10}$ alkylene radical, $R_3$ is a $C_1$ to $C_{12}$ alkylene radical, a $C_2$ to $C_{12}$ alkenylene radical or a multiply unsaturated $C_4$ to $C_{12}$ alkylene radical, the radical R' is selected from the group of $C_1$ to $C_{12}$ alkyl radicals, R" is a methyl or ethyl radical, and x=0 to 2.

$R_2$ is preferably a $C_1$ to $C_{10}$ alkylene radical or even a $C_1$ to $C_8$ alkylene radical. With particular preference it is a $C_1$ to $C_6$ alkylene radical, and very preferably a $C_1$ to $C_4$ alkylene radical or a $C_3$ alkylene radical. Regarding the radical R', reference may be made to the preferred, more preferred and very preferred features stated above. Furthermore, x is preferably 0 or 1 and very preferably x=0. $R_3$ is preferably a $C_1$ to $C_{12}$ alkylene radical or even a $C_1$ to $C_{10}$ alkylene radical. With particular preference it is a $C_1$ to $C_8$ alkylene radical and very preferably a $C_1$ to $C_6$ alkylene radical or a $C_3$ alkylene radical. Regarding the radical R', reference may be made to the preferred, more preferred and especially preferred features stated above. Furthermore, x is preferably 0 or 1 and very preferably x=0.

Component (B) preferably comprises the at least one Si-containing compound (b3) in an amount in the range from 0.1 to 20 wt %, more preferably in an amount in the range from 0.5 to 18 wt %, very preferably in an amount in the range from 1 to 16 wt %, more preferably in an amount in the range from 1.5 to 14 wt %, most preferably in an amount in the range from 2 to 12 wt %, based in each case on the total weight of component (B).

Component (B) preferably comprises the at least one Si-containing compound (b3) in an amount in the range from 0.1 to 15 wt %, more preferably in an amount in the range from 0.25 to 14 wt %, very preferably in an amount in the range from 0.5 to 12 wt %, more preferably in an amount in the range from 0.75 to 10 wt %, most preferably in an amount in the range from 1.0 to 8 wt %, based in each case on the total weight of the coating material composition of the invention.

Component (B) may comprise one or more commonly used additives and also one or more thickeners as further optional constituents. For these purposes, the thickeners and additives and the amounts thereof contemplated are the same as those already stated above in connection with component (A).

Optional Component (C)

Besides the two components (A) and (B), the coating material system of the invention may comprise a further component (C), which is different from (A) and (B) and is likewise present separately from (A) and (B). This component (C) functions as a component used for dilution, comprising one or more organic solvents and/or water. Component (C) therefore comprises at least one organic solvent and/or water. Organic solvents contemplated are the same solvents already stated above in connection with components (A) and (B).

Inventive Coating Material Composition

A further subject of the present invention is a primer coating material composition which is obtainable by combining at least the components (A) and (B) of the coating material system of the invention. The expression "combining" here includes mixing, especially homogeneous mixing.

All preferred embodiments described hereinabove in connection with the coating material system of the invention are also preferred embodiments in relation to the coating material composition of the invention.

The fractions in wt % of all the constituents contained in the coating material composition of the invention add up to 100 wt %, based on the total weight of the coating material composition.

The coating material composition of the invention is aqueous overall. The term "aqueous" in connection with the coating material composition of the invention is to be understood for the purposes of the present invention as a system whose solvent comprises water as its main constituent, preferably in an amount of at least 17.5 wt %, and organic solvents in smaller fractions, preferably in an amount of <15 wt %, based in each case on the total weight of the coating material composition of the invention.

The coating material composition of the invention preferably comprises a fraction of water of at least 20 wt %, more preferably of at least 22.5 wt %, very preferably of at least 25 wt %, based in each case on the total weight of the coating material composition of the invention.

The coating material composition of the invention preferably comprises a fraction of water which is in a range from 17.5 to 65 wt %, more preferably in a range from 20 to 60 wt %, very preferably in a range from 25 to 55 wt %, based in each case on the total weight of the coating material composition of the invention.

The coating material composition of the invention preferably comprises a fraction of organic solvents which is in a range of <15 wt %, more preferably in a range from 2 to <15 wt %, very preferably in a range from 3 to 14 wt % or to 13 wt % or to 10 wt %, based in each case on the total weight of the coating material composition of the invention.

The solids content of the coating material composition of the invention is preferably in a range from 10 to 70 wt %, more preferably in a range from 15 to 65 wt %, very preferably in a range from 20 to 60 wt %, more particularly from 25 wt % to 55 wt %, based in each case on the total weight of the coating material composition of the invention. The solids content is determined by the method described hereinafter.

The molar ratio of the functional groups of the polymer (a1) that are reactive toward isocyanate groups, these functional groups preferably being OH groups, to the isocyanate groups of the polyisocyanate (b1) in the coating composition is preferably in a range from 1:1 to 1:20, more preferably in a range from 1:1.1 to 1:15, very preferably in a range from 1:1.2 to 1:12.5, especially preferably in a range from 1:1.5 to 1:10, most preferably in a range from 1:2 to 1:9.

The NCO content of the coating material composition of the invention, based in each case on the total solids content, is preferably in a range from 1 to 12 wt %, more preferably in a range from 1 to 10 wt %, very preferably in a range from 1.5 to 9 wt %, more preferably still in a range from 2 to 8 wt %, most preferably in a range from 3 to 7 wt %. The NCO content here corresponds in each case to the NCO content calculated theoretically.

Inventive Use

A further subject of the present invention is the use of the coating material system of the invention or of the coating material composition of the invention for at least partially applying a primer coating material composition to at least one optionally pretreated surface of a plastics substrate.

All embodiments preferred in connection with the coating material system of the invention and the coating material composition of the invention and described hereinabove are also preferred embodiments in relation to the inventive use identified above.

Inventive Methods

A further subject of the present invention is a method for at least partially coating at least one surface of a plastics substrate with a primer, wherein the method comprises at least a step (1), namely (1) at least partially applying the primer coating material composition of the invention to at least one optionally pretreated surface of a plastics substrate.

All embodiments preferred in connection with the coating material system of the invention and the coating material composition of the invention and described hereinabove are also preferred embodiments in relation to the method of the invention identified above.

A further subject of the present invention is a method for at least partially coating at least one surface of a plastics substrate with a multicoat paint system, wherein the method comprises at least the following steps (1) to (7), namely (1) at least partial application of the primer coating material composition of the invention to at least one optionally pretreated surface of a plastics substrate, (2) interim drying of the primer coating material composition applied according to step (1), preferably at room temperature, to give a primer film, (3) application of at least one basecoat composition to the primer film obtained after step (2), (4) interim drying of the at least one basecoat composition applied according to step (3), preferably at room temperature, to give at least one basecoat film, (5) application of a clearcoat composition to the at least one basecoat film obtained after step (4), and (6) interim drying of the clearcoat composition applied according to step (5), preferably at room temperature, to give a clearcoat film, and (7) joint curing of the resultant primer film, basecoat film(s), and clearcoat film at a temperature <100° C.

All embodiments preferred in connection with the coating material system of the invention and the coating material composition of the invention and described hereinabove are also preferred embodiments in relation to the method of the invention identified above.

The method of the invention for at least partially coating at least one surface of a plastics substrate with a multicoat paint system is a wet-on-wet method wherein primer film, basecoat film, and clearcoat film are applied wet in steps (1), (3), and (5), and only thereafter are all three films jointly cured. If a basecoat film is applied within step (3), the method is a 3C1B process. If two basecoat films are applied within step (3), the method is a 4C1B process. A 3C1B process is preferred, however. The method of the invention finds preferred application in the OEM finishing of automobiles.

The terms "basecoat material" and, respectively, "basecoat film" are known to the skilled person and are used preferably as a designation for a color- and/or effect-imparting intermediate coating in general industrial finishing, especially automotive (OEM) finishing. The basecoat material or the basecoat film here preferably forms the second coat in a three-coat finish made up of primer, basecoat, and clearcoat. Basecoat materials which can be used are commercial basecoat materials, with aqueous basecoat materials being preferred. Where 2K basecoat materials are used, it is possible to employ the same binder constituents described above as constituents (a1) and (b1). Where 1K basecoat materials are used, as is preferred, the binder constituents employed may be the same as described above as constituents (a1). As crosslinkers of the binder system it is possible in this case to make use for example of amino resins such as melamine resins, and more particularly melamine-formaldehyde resins, and/or of blocked polyisocyanates. It is also possible, however, and preferable, for the binder constituents used not to be chemically crosslinking, and for the basecoat material, therefore, to be cured not by chemical curing but instead merely by physical drying.

A clearcoat material, as is known, is a coating material which, following application and curing, forms a transparent coating (the cured clearcoat film) having protective and/or decorative properties. Protective properties are, for example, scratch resistance and weathering stability, especially UV resistance. An example of a decorative property is a high gloss. The clearcoat materials for use are the clearcoat materials used customarily in the field of plastics finishing, the selection and use of such materials being known to the skilled person (in this regard compare also Rompp-Lexikon Lacke and Druckfarben, Georg Thieme Verlag, Stuttgart, New York, 1998, page 325). As clearcoat materials, accordingly, it is possible to use commercial clearcoat materials which are solvent-based. 2K clearcoat materials are preferred here. It is also possible to use the inventively employed component (B) as the curing component of a 2K clearcoat material of this kind.

Step (1)

Step (1) uses a plastics substrate which has at least one optionally pretreated surface. The pretreatment takes place optionally and preferably before step (1) is carried out. Possible pretreatments to which the substrate may be subjected include flaming, plasma treatment and/or corona treatment, more particularly flaming.

The primer coating material composition of the invention is applied in step (1) such that the resultant primer film following implementation of step (6) preferably has a dry film thickness in the range from 5 to 150 μm, more preferably from 8 to 120 μm, very preferably from 10 to 100 μm, more particularly from 10 to 80 μm.

Steps (2)

Step (2) envisages interim drying of the primer coating material composition applied according to step (1), to give a primer film.

Step (3)

The basecoat composition is applied in step (3) such that the resulting basecoat film after implementation of step (6) preferably has a dry film thickness in the range from 5 to 80 μm, more preferably from 7.5 to 70 μm, more particularly from 10 to 60 μm, most preferably from 10 to 50 μm.

Step (4)

Step (4) envisages interim drying of the basecoat composition applied according to step (3), to give a basecoat film.

Step (5) The clearcoat composition is applied in step (5) such that the resulting clearcoat film after implementation of step (6) preferably has a dry film thickness in the range from 20 to 60 µm, more preferably from 25 to 50 µm.

Step (6)

Step (6) envisages interim drying of the clearcoat composition applied according to step (5), to give a clearcoat film.

Step (7)

Step (7) envisages the joint curing of the resultant primer film, basecoat film(s), and clearcoat film at a temperature <100° C.

The application of the aqueous primer coating material composition of the invention in step (1) and, analogously, the applications according to steps (3) and (5) as well may take place by means of all customary application techniques, such as, for example, spraying, knife coating, spreading, pouring, dipping, impregnating, trickling or rolling, preferably by spray application. On such application, the substrate to be coated may itself be at rest, with the application equipment or application unit being moved. Alternatively, the substrate to be coated may be moved, with the application unit being at rest relative to the substrate or moved appropriately. Preference is given to employing spray application techniques, such as compressed air spraying (pneumatic application), airless spraying, high-speed rotation, or electrostatic spray application (ESTA), for example, optionally in conjunction with hot spray application such as hot air spraying, for example. ESTA is particularly preferred in each case.

The interim drying steps (2), (4), and (6) envisage the partial drying of the respectively applied coating material composition. The term "drying" in the context of the present invention refers preferably to the partial removal of organic solvent and/or water from the respectively applied coating material. Depending on the nature of the binder used, it may of course be the case here that crosslinking reactions already occur. In any case, however, the crosslinking is not yet complete. In other words, no fully cured coating film is produced here. The interim drying is carried out in each case preferably at room temperature, i.e., at a temperature in the range from 10 to 50° C., preferably from 12 to 45° C., more preferably at a temperature in the range from 14 to 40° C., more preferably still at a temperature of 16 to 35° C., very preferably at a temperature of 18 to 25° C., in each case for preferably 5 to 30, more preferably 7 to 25 minutes, more preferably still 10 to 20 minutes.

The interim drying steps (2) and (4) and also (6) take place preferably in each case by supply of air, the air velocity of the supplied air being preferably at least 0.3 m/s, more preferably at least 0.4 m/s, very preferably in a range from 0.4 to 0.8 m/s or even higher.

The joint curing according to step (7) of the method of the invention has no peculiarities in terms of method, but instead takes place in accordance with the customary and known techniques such as, for example, heating in a forced air oven and/or irradiation with IR lamps. Also possible is actinic curing by means, for example, of UV radiation in the case of radiation-curing systems. The curing conditions, particularly the curing temperatures, are guided, for example, by the temperature sensitivity of the substrates used or by the choice of binders used. Curing presently takes place at a temperature <100° C., more preferably 60° C. to <100° C., especially preferably at 70° C. to 95° C. The duration of the curing phase is also selected individually and is dependent on factors including those already specified (for example, choice of binders and/or of curing temperatures). Curing may take place, for example, over a period of 5 to 100 minutes, preferably 10 minutes to 45 minutes.

Multicoat Paint System

A further subject of the present invention is a multicoat paint system which is obtainable after implementation of the method of the invention for at least partially coating at least one surface of a plastics substrate with a multicoat paint system.

All embodiments preferred in connection with the coating material system of the invention, with the coating material composition of the invention, and with the methods of the invention and described hereinabove are also preferred embodiments in relation to the multicoat paint system of the invention.

At Least Partially Coated Substrate

A further subject of the present invention is a substrate coated at least partially with the multicoat paint system of the invention. Substrates used are the plastics substrates already identified above, i.e. substrates composed of or based on at least one plastic.

All embodiments preferred in connection with the coating material system of the invention, with the coating material composition of the invention, and with the methods of the invention, and also with the multicoat paint system of the invention, and described hereinabove are also preferred embodiments in relation to the at least partially coated substrate of the invention.

Methods of Determination

1. Determining the Nonvolatile Fraction

The nonvolatile fraction (the solids content) is determined according to DIN EN ISO 3251 (date: June 2008). This involves weighing out 1 g of sample into an aluminum dish dried beforehand and drying the dish with sample in a drying cabinet at 105° C. for 60 minutes, cooling it in a desiccator, and then weighing again. The residue relative to the total amount of sample used corresponds to the nonvolatile fraction.

2. Determining the Number-Average and Weight-Average Molecular Weights

The number-average ($M_n$) and weight-average ($M_w$) molecular weights are determined by means of gel permeation chromatography (GPC) with tetrahydrofuran as eluent and using a polystyrene standard according to ISO 13885-1:2008. A styrene-divinylbenzene copolymer is used as column material. With this method it is also possible to determine the polydispersity (ratio of weight-average molecular weight ($M_W$) to number-average molecular weight ($M_n$)).

3. Determining the Film Thicknesses

The film thicknesses are determined according to DIN EN ISO 2808 (date: May 2007), Method 6A in section 5.4.4.2 of the standard, using a measuring microscope.

4. Determining the Adhesion by the Steam Jet Test

The adhesion between a primer film applied to the substrate used, and a basecoat and clearcoat film lying above it, is determined and evaluated by means of the method described below.

A steam jet test is carried out according to DIN EN ISO 55662 (date: December 2009). This is followed by an evaluation using a grade system. A steam jet is directed perpendicularly onto the coated substrate under investigation, from a distance of 10 cm at a temperature of 60° C. and at 67 bar, for one minute. This is followed by evaluation of the adhesion via a grade system with grades from 0 to 5, with grade 0 being awarded for coatings which have no visible traces following steam jet treatment (very good adhesion), and grade 5 being awarded for coatings which after the steam jet test showed significantly detached regions (inadequate adhesion).

This steam jet test is carried out before weathering in a climate chamber and once after such weathering. The weathering in the climate chamber takes place in storage under constant humidity conditions according to DIN EN ISO 6270-2 under CH test conditions (date: September 2005). During the storage period, the coated substrates under investigation are stored in the climate chamber at 100% atmospheric humidity and 40° C. for 10 days. The steam jet test following removal from the climate chamber is carried out 24 hours after removal of the samples.

5. Determining the Stone-Chip Resistance

The stone-chip resistance is determined and evaluated according to DIN EN ISO 20567-1 B (date: July 2017). The test is always carried out in each case on a particular position of the surface of the substrate. The assessment is made on the basis of characteristic values in the range from 0 (best value) to 5 (poorest value).

6. Implementing a Temperature Change Test (TCT)

This implementation envisages the storage of an inventive multicoat paint system or of a corresponding comparative multicoat paint system. The temperature change test is carried out in three so-called cycles. One cycle (24) consists in this case of 15 h of storage at 105° C., 30 minutes of storage at 23° C.±2° C., 8 h of storage at −40° C., and 30 minutes of storage at 23° C.±2° C. Following the TCT, the above-described steam jet test is carried out according to DIN EN ISO 55662 (date: December 2009).

7. Assessing the Chemical Resistance

The chemical resistance is determined and evaluated according to DIN EN ISO 2812-3 (date: October 2012) or according to DIN EN ISO 2812-4 (date: May 2007). The assessment is made on the basis of characteristic values in the range from 0 (best value) to 5 (poorest value).

8. Determining the Appearance

The appearance is assessed using a Wave scan instrument from Byk/Gardner. For the purpose of assessing the appearance, a laser beam is directed at an angle of 60° onto the surface under investigation, and the fluctuations in the reflected light over a measuring distance of 10 cm are recorded in the short wave region (0.3 to 1.2 mm) and in the long wave region (1.2 to 12 mm) by means of the instrument (long wave=LW; short wave=SW; the lower the values, the better the appearance. Moreover, as a measure of the sharpness of an image reflected in the surface of the multicoat system, the instrument determines the characteristic variable "distinctness of image" (DOI) (the higher the value, the better the appearance). Furthermore, using the instrument employed, there is also determination of the COMB-FORD value (the higher the value, the better the appearance).

9. Implementing the PV 1200 Temperature Change Test

This implementation envisages the storage of an inventive multicoat paint system or of a corresponding comparative multicoat paint system under the conditions of the Volkswagen AG PV 1200 test protocol. Following this, the above-described steam jet test is carried out according to DIN EN ISO 55662 (date: December 2009).

Inventive and Comparative Examples

The inventive and comparative examples below serve to elucidate the invention but should not be interpreted restrictively. Unless otherwise stated, the amounts in parts are parts by weight, and amounts in percent are percentages by weight in each case.

1. Production of 2K Primer Coating Material Compositions P1 and P2

1.1 Paint Base Component S1

The components identified in table 1.1 below are mixed homogeneously with one another in the order stated, to produce the paint base component S1.

TABLE 1.1

Preparation of paint base component S1

| Components used in preparing the paint base component | Amount [wt %] |
|---|---|
| Aqueous dispersion of an OH-functional polyurethane (41 wt % solids; OH number (calculated): 45 mg KOH/g polyurethane; $M_W$ = 13 500 g/mol) | 30.0 |
| Neutralizing agent | 0.9 |
| Butyl glycol | 3.7 |
| Commercially available wetting and dispersing agent | 1.1 |
| Commercially available defoamer | 1.4 |
| Commercially available rheological additive | 11.5 |
| Commercially available fumed silica | 1.2 |
| Conductive carbon black pigment | 1.8 |
| Deionized water | 1.2 |
| Talc | 2.8 |
| Titanium dioxide | 22.4 |
| Deionized water | 9.3 |
| Butyl glycol acetate | 3.5 |
| Butyl glycol | 1.0 |
| Commercially available surfactant | 0.2 |
| Deionized water | 8.0 |
| | Σ 100 wt % |

1.2 Curing Component H1 (Comparative)

The components identified in table 1.2 below are mixed homogeneously with one another in the order stated, to produce the curing component H1 as a comparative.

TABLE 1.2

Preparation of curing component H1

| Components used in preparing the curing component | Amount [wt %] |
|---|---|
| Desmodur ® N 3390 (HDI isocyanurate) (90 wt % in a 1:1 mixture of butyl acetate/solvent naphtha 160/180) | 75.0 |
| Butyl acetate | 12.5 |
| Solvent naphtha 160/180 | 12.5 |
| | Σ 100 wt % |

1.3 Curing Component H2

The comparative curing component H1 described in section 1.2 and table 1.2 above is admixed with 3-glycidyloxypropyltrimethoxysilane in an amount such that the resulting curing component H2 comprises 3-glycidyloxypropyltrimethoxysilane in an amount of 7.41 wt %, based on its total weight. H2 is an inventively employed curing component.

1.4 By Mixing Paint Base Component S1 with Curing Agent H1, comparative primer compositions of series P1 are obtained, and by mixing paint base component S1 with curing agent H2, inventive primer compositions of the series P2 are obtained.

The mixing proportions of paint base to curing agent used in this context are as follows (figures are in parts by weight in each case):

P1a: 100 parts paint base S1: 15 parts curing agent H1 (not inventive)

P1b: 100 parts paint base S1: 25 parts curing agent H1 (not inventive)

P2a: 100 parts paint base S1: 16.2 parts curing agent H2 (inventive)

P2b: 100 parts paint base S1: 27 parts curing agent H2 (inventive).

In the case of P1a and P2a, the molar ratio of OH groups to NCO groups is 1:5. In the case of P1b and P2b, the molar ratio of OH groups to NCO groups is 1:8.

1.5 Curing Components H5a and H5b

The comparative curing component H1 described in section 1.2 and table 1.2 above is admixed with the commercially available product Geniosil® GF 60 (N-methyl[3-(trimethoxysilyl)propyl]carbamate) in an amount such that the resulting curing component comprises this product in an amount of 5.1 wt % (H5a) or 9.6 wt % (H5b), based in each case on its total weight. H5a and H5b are inventively employed curing components.

By mixing paint base component S1 with curing agent H5a and, respectively, H5b, inventive primer compositions of series P2 are obtained. The mixing proportions of paint base to curing agent used in this context are as follows (figures are in parts by weight in each case):

P2c: 100 parts paint base S1: 15.8 parts curing agent H5a (inventive)

P2d: 100 parts paint base S1: 16.6 parts curing agent H5b (inventive)

1.6 Curing Component H6a

The comparative curing component H1 described in section 1.2 and table 1.2 above is admixed with the commercially available product Geniosil® GF 80 (3-glycidyloxypropyltrimethoxysilane) in an amount such that the resulting curing component comprises this product in an amount of 5.1 wt % (H6a), based on its total weight. H6a is an inventively employed curing component.

By mixing paint base component S1 with curing agent H6a, an inventive primer composition of series P2 is obtained. The mixing proportions of paint base to curing agent used in this context are as follows (figures are in parts by weight in each case):

P2e: 100 parts paint base S1: 15.8 parts curing agent H6a (inventive)

1.7 Curing Components H7a and H7b

The comparative curing component H1 described in section 1.2 and table 1.2 above is admixed with the commercially available silane 25013VP from Wacker (hexadecyltrimethoxysilane) in an amount such that the resulting curing component comprises this product in an amount of 5.1 wt % (H7a) or 9.6 wt % (H7b), based in each case on its total weight. H7a and H7b are inventively employed curing components.

By mixing paint base component S1 with curing agent H7a and, respectively, H7b, inventive primer compositions of series P2 are obtained. The mixing proportions of paint base to curing agent used in this context are as follows (figures are in parts by weight in each case):

P2f: 100 parts paint base S1: 15.8 parts curing agent H7a (inventive)

P2g: 100 parts paint base S1: 16.6 parts curing agent H7b (inventive)

1.8 Curing Component H8a

The comparative curing component H1 described in section 1.2 and table 1.2 above is admixed with phenyltriethoxysilane in an amount such that the resulting curing component comprises this product in an amount of 5.1 wt % (H8a), based on its total weight. H8a is an inventively employed curing component.

By mixing paint base component S1 with curing agent H8a, an inventive primer composition of series P2 is obtained. The mixing proportions of paint base to curing agent used in this context are as follows (figures are in parts by weight in each case):

P2i: 100 parts paint base S1: 15.8 parts curing agent H8a (inventive)

1.9 Curing Components H9a and H9b

The comparative curing component H1 described in section 1.2 and table 1.2 above is admixed with 1,2-bis(triethoxysilyl)ethane in an amount such that the resulting curing component comprises this product in an amount of 5.1 wt % (H9a) or 9.6 wt % (H9b), based in each case on its total weight. H9a and H9b are inventively employed curing components.

By mixing paint base component S1 with curing agent H9a and, respectively, H9b, inventive primer compositions of series P2 are obtained. The mixing proportions of paint base to curing agent used in this context are as follows (figures are in parts by weight in each case):

P2j: 100 parts paint base S1: 15.8 parts curing agent H9a (inventive)

P2k: 100 parts paint base S1: 16.6 parts curing agent H9b (inventive)

1.10 Curing Components H10a and H10b

The comparative curing component H1 described in section 1.2 and table 1.2 above is admixed with the reaction product of 3 parts of Dynasylan® 1124 (bis(trimethoxysilylpropyl)amine) with Desmodur® N 3300 in an amount such that the resulting curing component comprises this product in an amount of 2.6 wt % (H10a) or 5.1 wt % (H10b), based in each case on its total weight. H10a and H10b are inventively employed curing components.

By mixing paint base component S1 with curing agent H10a and, respectively, H10b, inventive primer compositions of series P2 are obtained. The mixing proportions of paint base to curing agent used in this context are as follows (figures are in parts by weight in each case):

P2l: 100 parts paint base S1: 15.4 parts curing agent H10a (inventive)

P2m: 100 parts paint base S1: 15.8 parts curing agent H10b (inventive)

2. Aqueous 1K Basecoat Materials Used 2.1 Basecoat Material B1

Basecoat material B1 is a commercial aqueous 1K basecoat material which comprises as at least one color-imparting pigment a red pigment (commercial product ColorBrite® Jupiter Red).

2.2 Basecoat material B2

Basecoat material B2 is a commercial aqueous metallic 1K basecoat material which comprises as at least one effect pigment a commercial aluminum pigment (commercial product ColorBrite® AC Polar Silver).

2.3 Basecoat Material B3

Basecoat material B3 is a commercial aqueous 1K basecoat material which comprises as at least one color-imparting pigment a green pigment (commercial product ColorBrite® AC Elbait Green).

2.4 Basecoat Material B4

Basecoat material B4 is a commercial aqueous 1K basecoat material from the ColorBrite® series which comprises as at least one color-imparting pigment a black pigment.

3. Preparation of 2K Clearcoat Materials K1 and K2

A commercial solventborne 2K clearcoat material (CM) is used which is prepared by mixing together a paint base component comprising at least one OH-functional poly(meth)acrylate and a curing component comprising at least one free polyisocyanate (commercial product Evergloss® 906). The paint base component of this commercially available clearcoat material is referred to below as "paint base component S2". The curing component of this commercially available clearcoat material is referred to below as "curing component H3". The component employed as curing component H3 is the same curing component described above as curing component H1 in connection with the primer in section 1.2. Alternatively, in certain cases, H3 is replaced by the use of a curing component H4. The component employed as curing component H4 is the same curing component described above as curing component H2 in connection with the primer in section 1.3.

By mixing paint base component S2 with curing agent H3 or H4, clearcoat compositions are obtained of series K1 (S2H3) and, respectively, of series K2 (S2H4).

The mixing proportions of paint base to curing agent used here are as follows (figures are parts by weight in each case):

K1a: 100 parts paint base S2: 35 parts curing agent H3
K2a: 100 parts paint base S2: 37.5 parts curing agent H4.

4.2 Production of Coated Substrates 4.2.1 Substrates used are plastics substrates, in each case in the form of test plates with an area of 10 cm×14 cm×0.3 cm. Plastics substrates used are substrates of PP/EPDM (polypropylene/ethylene-propylene-diene rubber; Sabic® 8500) (substrate T1). Additionally, a series of further substrates are used, namely PC/PBT (polycarbonate/polybutylene terephthalate; Bayblend® T 65 XF 901510; T2), PC/ABS (polycarbonate/acrylonitrile-butadiene-styrene; Xenoy® CL101D black; T3), PU/RIM (polyurethane/reaction injection molding; T4), and CRP (carbon fiber-reinforced plastic, T5). Substrate T1 is subjected to flaming three times with a propane burner at a slow belt speed (0.45±0.2 m/sec) from a distance of 5.2±0.2 cm at a volume flow setting of gas=5.2±0.2 L/min and air=125±5 L/min.

4.2.2 Subsequently, the pretreated substrates T1 to T5 are coated in succession with a primer composition of series P1 or P2, a basecoat material B1 or B2 or B3, and a clearcoat material of series K1 or K2.

A number of different method variants are carried out here:

Variant v1:

v1 comprises the following component steps:

A primer of series P1 or P2 is applied to the substrate and this is followed by drying in circulating air at room temperature (20° C.) for a time of 10 minutes. Then curing takes place at 80° C. (substrate temperature) for a time of 30 minutes. Thereafter the basecoat material is applied and drying takes place in circulating air at room temperature (20° C.) for a time of 10 minutes. This is followed by curing at 80° C. for a time of 10 minutes. Thereafter a clearcoat material of series K1 or K2 is applied and drying takes place in circulating air at room temperature (20° C.) for a time of 10 minutes. This is followed by curing at 80° C. for a time of 30 minutes.

Variant v2:

v2 comprises the following component steps:

A primer of series P1 or P2 is applied to the substrate and this is followed by drying in circulating air at room temperature (20° C.) for a time of 10 minutes. Thereafter the basecoat material is applied and drying takes place in circulating air at room temperature (20° C.) for a time of 10 minutes. Thereafter a clearcoat material of series K1 or K2 is applied and drying takes place in circulating air at room temperature (20° C.) for a time of 10 minutes. Then all of the films are jointly cured at 90° C. (substrate temperature) for a time of 30 minutes.

Variant v3:

v3 comprises the following component steps:

A primer of series P1 or P2 is applied to the substrate and this is followed by drying in circulating air at room temperature (20° C.) for a time of 10 minutes. Thereafter the basecoat material is applied and drying takes place in circulating air at room temperature (20° C.) for a time of 15 minutes. Thereafter a clearcoat material of series K1 or K2 is applied and drying takes place in circulating air at room temperature (20° C.) for a time of 10 minutes. Then all of the films are jointly cured at 90° C. (substrate temperature) for a time of 30 minutes.

Variant v4:

v4 comprises the following component steps:

A primer of series P1 or P2 is applied to the substrate and this is followed by drying in circulating air at room temperature (20° C.) for a time of 10 minutes. Thereafter the basecoat material is applied and drying takes place in circulating air at room temperature (20° C.) for a time of 15 minutes. Thereafter a clearcoat material of series K1 or K2 is applied and drying takes place in circulating air at room temperature (20° C.) for a time of 10 minutes. Then all of the films are jointly cured at 80° C. (substrate temperature) for a time of 40 minutes.

Variant v5:

v5 comprises the following component steps:

A primer of series P1 or P2 is applied to the substrate and this is followed by drying in circulating air at room temperature (20° C.) for a time of 10 minutes. Thereafter the basecoat material is applied and drying takes place in circulating air at room temperature (20° C.) for a time of 10 minutes. Thereafter a clearcoat material of series K1 or K2 is applied and drying takes place in circulating air at room temperature (20° C.) for a time of 10 minutes. Then all of the films are jointly cured at 80° C. (substrate temperature) for a time of 40 minutes.

Variant v6:

v6 comprises the following component steps:

A primer of series P1 or P2 is applied to the substrate and this is followed by drying in circulating air at room temperature (20° C.) for a time of 15 minutes. Thereafter the basecoat material is applied and drying takes place in circulating air at room temperature (20° C.) for a time of 10 minutes. Thereafter a clearcoat material of series K1 or K2 is applied and drying takes place in circulating air at room temperature (20° C.) for a time of 10 minutes. Then all of the films are jointly cured at 80° C. (substrate temperature) for a time of 40 minutes.

In each of the variants, the primer of series P1 or P2 is applied in a dry film thickness of 10 to 15 µm, the basecoat material B1 or B2 or B3 in a dry film thickness of 11 to 25 µm, and the clearcoat material of series K1 or K2 in a dry film thickness of 25 to 35 µm.

5. Investigation of the Properties of the Coated Substrates

Various performance technology properties of the multicoat paint systems obtained were investigated. The investigation took place in accordance with the methods described above. These results are summarized in tables 4a to 4k below. The results reported are the average values from 4 to 8 determinations (and in some cases are therefore reported with a decimal place).

TABLE 4a the substrate used in each case was a substrate T1

| Multicoat finishing system | 1 (Comparative) | 2 (Comparative) | 3 (Inventive) | 4 (Comparative) | 5 (Inventive) |
|---|---|---|---|---|---|
| Primer | P1a | P1a | P2a | P1b | P2b |
| Basecoat | B2 | B2 | B2 | B2 | B2 |
| Clearcoat | K1a | K1a | K2a | K1a | K2a |
| Method variant | v5 | v4 | v4 | v4 | v4 |
| Results | | | | | |
| Stone chip resistance before constant conditions (CC) | — | — | 0.5 | 0.5 | 0.5 |
| Steam jet test before CC | 2.43 | 1.71 | 1.43 | 1.57 | 0.07 |
| Steam jet test after CC | 2 | 3 | 1.25 | 2.25 | 0 |
| Steam jet test after TCT | — | — | 1 | 2.88 | 0.5 |

A comparison of the results for systems 2 versus 3 and 4 versus 5 shows that for the multicoat paint systems produced using a primer coating composition of the invention, the results achieved were consistently significantly better than with corresponding comparative primer coating compositions.

TABLE 4b the substrate used in each case was a substrate T1

| Multicoat finishing system | 4 (Comparative) | 5 (Inventive) |
|---|---|---|
| Substrate | T1 | T1 |
| Primer | P1b | P2b |
| Basecoat | B2 | B2 |
| Clearcoat | K1a | K2a |
| Method variant | v4 | v4 |
| Results for chemical resistance: | 1 h after curing of the multicoat paint system/ 24 h after curing of the multicoat paint system | 1 h after curing of the multicoat paint system/ 24 h after curing of the multicoat paint system |
| FAM A Test fuel as per DIN 51604 Parts I and II; Determination according to DIN EN ISO 2812-3 | 3/2 | 3/2 |
| FAM B Test fuel as per DIN 51604 Part I and II; Determination according to DIN EN ISO 2812-3 | 4/3 | 4/3 |
| Isopropanol; Determination according to DIN EN ISO 2812-3 | 2/2 | 1/1 |
| NaOH (1 wt % in water); Determination according to DIN EN ISO 2812-4 | 0/0 | 1/0 |
| $H_2SO_4$ (10 wt % in water); Determination according to DIN EN ISO 2812-4 | 0/0 | 0/0 |
| Deionized water, 1 h at 80° C. ± 2° C.; (covered in the forced air oven); Determination according to DIN EN ISO 2812-4 | 0/0 | 0/0 |
| Pancreatin, 1 h at 60° C. ± 2° C.; Determination according to DIN EN ISO 2812-4 | 2/1 | 0/0 |
| Tree resin, h at 45° C. ± 2° C.; Determination according to DIN EN ISO 2812-4 | 1/1 | 1/1 |

A comparison of the results for systems 4 versus 5 shows that for the multicoat paint systems produced using a primer coating composition of the invention, particularly with regard to the chemical resistance with respect to pancreatin, the results achieved were better than with corresponding comparative primer coating compositions.

TABLE 4c the substrate used in each case was a substrate T1

| Multicoat finishing system | 4 (Comparative) | 5 (Inventive) | 6 (Comparative) | 7 (Inventive) |
|---|---|---|---|---|
| Primer | P1b | P2b | P1b | P2b |
| Basecoat | B2 | B2 | B1 | B1 |
| Clearcoat | K1a | K2a | K1a | K2a |
| Method variant | v4 | v4 | v4 | v4 |
| Results for appearance | | | | |
| SW | 12.1 | 14.6 | 12.2 | 10.25 |
| LW | 8.4 | 7.9 | 7.75 | 6.65 |
| DOI | 77.03 | 76.72 | 95.38 | 96.13 |
| COMBFORD | 49.75 | 51.35 | 64.00 | 65.55 |

A comparison of the results for systems 4 versus 5 and 6 versus 7 shows that for the multicoat paint systems produced using a primer coating composition of the invention, particularly with regard to the appearance at LW, the results achieved were better than with corresponding comparative primer coating compositions.

TABLE 4d the substrate used in each case was a substrate T1

| Multicoat finishing system | 8 (Comparative) | 9 (Inventive) |
|---|---|---|
| Primer | P1b | P2b |
| Basecoat | B3 | B3 |
| Clearcoat | K1a | K2a |
| Method variant | v4 | v4 |
| Results for appearance | | |
| SW | 14.45 | 13.95 |
| LW | 10.15 | 7.85 |
| DOI | 80.65 | 83.65 |
| COMBFORD | 51.25 | 55.40 |

A comparison of the results for systems 8 versus 9 shows that for the multicoat paint systems produced using a primer coating composition of the invention, particularly with regard to the appearance at LW, the results achieved were better than with corresponding comparative primer coating compositions.

TABLE 4e

Using different substrates

| Multicoat finishing system | 10 (inventive) | 11 (inventive) | 12 (inventive) | 13 (inventive) | 14 (inventive) |
|---|---|---|---|---|---|
| Substrate | T1 | T2 | T3 | T4 | T5 |
| Primer | P2b | P2b | P2b | P2b | P2b |
| Basecoat | B1 | B1 | B1 | B1 | B1 |
| Clearcoat | K2a | K2a | K2a | K2a | K2a |
| Method variant | v4 | v4 | v4 | v4 | v4 |
| Results | | | | | |
| Steam jet test before CC | 0.38 | 0.63 | 0.25 | 0.50 | 0.38 |

A comparison of the results for systems 10 to 14 shows that good results are achieved in each case, for different plastics substrates, for the multicoat paint systems produced using a primer coating composition of the invention.

TABLE 4f the substrate used in each case was a substrate T1

| Multicoat finishing system | 15 (inventive) | 16 (inventive) |
|---|---|---|
| Primer | P2c | P2d |
| Basecoat | B4 | B4 |
| Clearcoat | K1a | K1a |
| Method variant | v2 | v2 |
| Results | | |
| Steam jet test before CC | 0.6 | 0.6 |
| Steam jet test after CC | 0.6 | 0.4 |
| Steam jet test after PV1200 | 0.6 | 0.6 |

The results show that good results are achieved for both systems 15 and 16.

TABLE 4g the substrate used in each case was a substrate T1

| Multicoat finishing system | 17 (inventive) | 18 (not inventive) |
|---|---|---|
| Primer | P2e | P1a |
| Basecoat | B4 | B4 |
| Clearcoat | K1a | K1a |
| Method variant | v2 | v2 |
| Results | | |
| Steam jet test before CC | 0 | 0 |
| Steam jet test after CC | 0.4 | 2 |
| Steam jet test after PV1200 | 0 | 0.6 |

A comparison of the results for systems 17 versus 18 shows that better results, in particular in relation to the steam jet test after CC, were achieved for the multicoat paint systems produced using a primer coating composition of the invention than with the corresponding comparative primer coating composition.

TABLE 4h the substrate used in each case was a substrate T1

| Multicoat finishing system | 19 (inventive) | 20 (inventive) |
|---|---|---|
| Primer | P2f | P2g |
| Basecoat | B4 | B4 |
| Clearcoat | K1a | K1a |
| Method variant | v2 | v2 |
| Results | | |
| Steam jet test before CC | — | 0.8 |
| Steam jet test after CC | 0 | — |
| Steam jet test after PV1200 | — | 0.4 |

The results show that good results are achieved for both systems 19 and 20.

TABLE 4i the substrate used in each case was a substrate T1

| Multicoat finishing system | 21 (inventive) | 22 (not inventive) |
|---|---|---|
| Primer | P2i | P1a |
| Basecoat | B4 | B4 |
| Clearcoat | K1a | K1a |
| Method variant | v2 | v2 |
| Results | | |
| Steam jet test before CC | 0 | 0 |
| Steam jet test after CC | 0.8 | 1.8 |
| Steam jet test after PV1200 | 1 | 0.8 |

A comparison of the results for systems 21 versus 22 shows that better results, in particular in relation to the steam jet test after CC, were achieved for the multicoat paint systems produced using a primer coating composition of the invention than with the corresponding comparative primer coating composition.

TABLE 4j the substrate used in each case was substrate T1

| Multicoat finishing system | 23 (inventive) | 24 (inventive) |
|---|---|---|
| Primer | P2j | P2k |
| Basecoat | B4 | B4 |
| Clearcoat | K1a | K1a |
| Method variant | v2 | v2 |
| Results | | |
| Steam jet test before CC | 0.2 | 0.2 |
| Steam jet test after PV1200 | 1.0 | 0.8 |

The results show that good results are achieved for both systems 23 and 24.

TABLE 4k

| the substrate used in each case was a substrate T1 | | | |
|---|---|---|---|
| Multicoat finishing system | 25 (inventive) | 26 (inventive) | 27 (not inventive) |
| Primer | P2l | P2m | P1a |
| Basecoat | B4 | B4 | B4 |
| Clearcoat | K1a | K1a | K1a |
| Method variant | v2 | v2 | v2 |
| Results | | | |
| Steam jet test before CC | 0.2 | 0.2 | 0 |
| Steam jet test after CC | 0.6 | 0.8 | 2 |
| Steam jet test after PV1200 | 0.2 | 0.2 | 0 |

A comparison of the results for systems 25 and 26 versus 27 shows that better results, in particular in relation to the steam jet test after CC, were achieved for the multicoat paint systems produced using a primer coating composition of the invention than with the corresponding comparative primer coating composition.

What is claimed is:

1. A method of at least partial application of a primer coating material composition, the method comprising at least partially applying the primer coating material composition to at least one optionally pretreated surface of a plastics substrate, the primer coating material composition obtainable by combining at least two components (A) and (B) of a coating material system, which are different from one another and are present separately from one another,
where component (A) is aqueous and comprises at least one polymer (a1) which contains functional groups that are reactive toward isocyanate groups, and comprises at least one pigment (a2) and/or at least one filler (a3), and
where component (B) is nonaqueous and comprises at least one polyisocyanate (1)1 having more than two free isocyanate groups, and also comprises at least one organic solvent (b2),
wherein component (B) further comprises at least one Si-containing compound (b3) which contains at least one hydrolyzable radical and at least one non-hydrolyzable organic radical, wherein at least one of the at least one Si-containing compounds (b3) contains at least one non-hydrolyzable organic radical selected from the group consisting of aliphatic radicals having 1 to 24 carbon atoms, cycloaliphatic radicals having 3 to 12 carbon atoms, aromatic radicals having 6 to 12 carbon atoms, and araliphatic radicals having 7 to 18 carbon atoms, each of these radicals optionally containing at least one functional group that is reactive toward isocyanate groups, said group in turn being optionally masked with at least one protective group which can be eliminated under hydrolytic conditions.

2. The method as claimed in claim 1, wherein component (B) comprises at least one silane compound as Si-containing compound (b3) of the following formula (I)

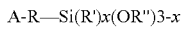
$$A-R-Si(R')_x(OR'')_{3-x} \quad (I),$$

where
A is a functional group that is reactive toward isocyanate groups and is optionally masked with a protective group which can be eliminated under hydrolytic conditions, or is H,
R is an aliphatic radical having 1 to 24 carbon atoms, a cycloaliphatic radical having 3 to 12 carbon atoms, an aromatic radical having 6 to 12 carbon atoms or an araliphatic radical having 7 to 18 carbon atoms,
R' is selected from the group consisting of C1- to C12-alkyl radicals,
R'' is a methyl or ethyl radical, and
x is an integer in a range from 0 to 2.

3. The method as claimed in claim 1, wherein component (B) comprises at least one silane compound as Si-containing compound (b3) whose at least one non-hydrolyzable organic radical comprises at least one epoxide group.

4. The method as claimed in claim 1, wherein component (B) comprises the at least one Si-containing compound (b3) in an amount in a range from 0.1 to 20 wt %, based on a total weight of component (B).

5. The method as claimed in claim 1, wherein said polyisocyanate (b1) comprises isocyanurate trimers of hexamethylene diisocyanate and/or of isophorone diisocyanate.

6. The method as claimed in claim 1, wherein said polymer (a1) comprises at least one OH-functional polymer selected from the group consisting of polyurethanes, polyureas, polyesters, polyamides, polyethers, poly(meth)acrylates and copolymers of the stated polymers.

7. The method as claimed in claim 1, wherein the coating material system consists of the two components (A) and (B) or which as well as the two components (A) and (B) comprises a further component (C), which is different from (A) and (B) and is likewise present separately from (A) and (B) and is used for dilution, said component (C) comprising one or more organic solvents and/or water.

8. The method as claimed in claim 1, wherein components (A) and (B) are present within the coating material system relative to one another such that an NCO content of the primer coating material composition which can be prepared by combining the at least the two components (A) and (B), based on its total solids content, is in a range from 1 to 12 wt %.

9. A method for at least partially coating at least one surface of a plastics substrate with a multicoat paint system, wherein the method comprises at least the following steps (1) to (7), namely
  (1) at least partial application of a primer coating material composition to at least one optionally pretreated surface of the plastics substrate, the primer coating material composition obtainable by combining at least two components (A) and (B) of a coating material system, which are different from one another and are present separately from one another, where component (A) is aqueous and comprises at least one polymer (a1) which contains functional groups that are reactive toward isocyanate groups, and comprises at least one pigment (a2) and/or at least one filler (a3), and where component (B) is nonaqueous and comprises at least one polyisocyanate (b1) having more than two free isocyanate groups, and also comprises at least one organic solvent (b2), wherein component (B) further comprises at least one Si-containing compound (b3) which contains at least one hydrolyzable radical and at least one non-hydrolyzable organic radical,
  (2) interim drying of the primer coating material composition applied according to step (1) to give a primer film,
  (3) application of at least one basecoat composition to the primer film obtained after step (2),
  (4) interim drying of the at least one basecoat composition applied according to step (3) to give at least one basecoat film, (5) application of a clearcoat composition to the at least one basecoat film obtained after step (4),
(6) interim drying of the clearcoat composition applied according to step (5) to give a clearcoat film, and (7) joint curing of the resultant primer film, the at least one basecoat fam-(s) film, and the clearcoat film at a temperature <100° C.

10. The method as claimed in claim 9, wherein the interim drying steps (2), (4), and (6) each take place by supplying air at room temperature, with an air velocity of at least 0.3 m/s.

11. The method as claimed in claim 9, wherein the method is a 3C1B method, in which precisely one basecoat composition is applied in step (3).

12. A multicoat paint system which is obtainable after implementation of the method as claimed in claim 9.

13. A plastics substrate coated at least partially with the multicoat paint system as claimed in claim 12.

14. The method as claimed in claim 9, wherein, in step (2), the interim drying of the primer coating material composition applied according to step (1) to give the primer film is performed at room temperature.

15. The method as claimed in claim 9, wherein, in step (4), the interim drying of the at least one basecoat composition applied according to step (3) to give the at least one basecoat film is performed at room temperature.

16. The method as claimed in claim 9, wherein, in step (6), the interim drying of the clearcoat composition applied according to step (5) to give the clearcoat film is performed at room temperature.

* * * * *